United States Patent Office.

WILLIAM JOHNSON, OF SHIRLEYSBURG, PENNSYLVANIA.

Letters Patent No. 68,511, dated September 3, 1867.

IMPROVED TANNING COMPOSITION.

*The Schedule referred to in these Letters Patent and making part of the same.*

TO ALL WHOM IT MAY CONCERN:

Be it known that I, WILLIAM JOHNSON, of Shirleysburg, in the county of Huntingdon, and State of Pennsylvania, have invented an improved Tanning Composition; and I do hereby declare that the following is a full, clear, and exact description thereof, which will enable others skilled in the art to make and use the same.

My invention has for its object to furnish an improved composition for tanning, which will tan the skins thoroughly in a very short time, and it consists in the ingredients combined in the proportions and in the manner hereinafter described.

I take one cord of bark, one hundred pounds of terra-japonica, ten ounces of saltpetre, ten ounces of ammonia, twenty gallons of urine, six quarts of salt, and ten ounces of Glauber's salt. This quantity of the ingredients, when thoroughly mixed together, is sufficient to tan a pack of one thousand pounds of green calf-skins into good and tough leather within ten days. The amount of the mixture used in each case will depend upon the amount and character of the skins in the pack, and the length of time within which the tanning is required to be done.

The above ingredients are put into the ordinary vats with the skins, together with the requisite amount of water, the various steps of the operation being conducted in the ordinary manner.

I claim as new, and desire to secure by Letters Patent—

An improved tanning composition formed by the combination of the above-mentioned ingredients with each other, substantially in the proportions herein set forth.

WILLIAM JOHNSON.

Witnesses:
GEORGE LEAS,
DAVID DOUGLAS.